UNITED STATES PATENT OFFICE.

JEREMIAH K. GUILE, OF ROCHESTER, NEW YORK, ASSIGNOR TO HIMSELF AND JOSEPH B. CHAMPION, OF NEW YORK CITY.

IMPROVEMENT IN ANTI-FRICTION METALS.

Specification forming part of Letters Patent No. 157,509, dated December 8, 1874; application filed October 3, 1874.

*To all whom it may concern:*

Be it known that I, JEREMIAH K. GUILE, of Rochester, in the county of Monroe and State of New York, have invented a new and useful Improvement in Anti-Friction Metal, of which the following is a specification:

My invention has for its object to furnish an improved anti-friction metal for journal-boxes and other bearings, and for other uses, which shall be so tough and hard that the entire box may be made of it, which will not heat from friction, and will take a high polish.

The invention consists in the anti-friction metal, prepared of the ingredients, in the proportions, and manner hereinafter described.

In preparing this metal, for each one hundred pounds I use sixty-eight pounds of zinc, twenty pounds of tin, ten pounds of antimony, one pound of glass, one-half a pound of slaked lime, and one-half a pound of borax.

The glass and slaked lime are first put into a red-hot crucible. After the glass is melted the borax is added and the mixture is thoroughly stirred. The zinc, tin, and antimony are then added, and, when melted, the mixture is thoroughly stirred until the various ingredients are evenly intermingled. The crucible is then removed, the dross is skimmed off, and the metal is ready to be molded into the desired shape, or may be cast into ingots for market.

Having thus described my invention, I claim as new and desire to secure by Letters Patent—

An anti-friction alloy consisting of sixty-eight parts of zinc, twenty of tin, and ten of antimony, as set forth.

JEREMIAH K. GUILE.

Witnesses:
  JAMES T. GRAHAM,
  ALEX. F. ROBERTS.